US007941963B2

(12) United States Patent
Myers, IV

(10) Patent No.: US 7,941,963 B2
(45) Date of Patent: *May 17, 2011

(54) SWIMMING WATERFOWL DECOY WITH SPRAY

(76) Inventor: Peter E. Myers, IV, Moncks Corner, SC (US)

( * ) Notice: Subject to any disclaimer, the term of this patent is extended or adjusted under 35 U.S.C. 154(b) by 185 days.

This patent is subject to a terminal disclaimer.

(21) Appl. No.: 12/313,249

(22) Filed: Nov. 18, 2008

(65) Prior Publication Data

US 2009/0113781 A1    May 7, 2009

Related U.S. Application Data

(62) Division of application No. 11/647,643, filed on Dec. 29, 2006, now Pat. No. 7,472,508.

(51) Int. Cl.
    *A01M 31/06*      (2006.01)
(52) U.S. Cl. .................................... 43/3; 43/26.1
(58) Field of Classification Search ............ 43/3, 2, 43/26.1; 446/153, 154, 160, 163, 164
See application file for complete search history.

(56) References Cited

U.S. PATENT DOCUMENTS

| | | | | | |
|---|---|---|---|---|---|
| 1,197,181 | A | * | 9/1916 | Buck | 440/40 |
| 1,758,847 | A | * | 5/1930 | McIntosh | 440/40 |
| 1,893,507 | A | * | 1/1933 | Ranney | 446/163 |
| 2,101,646 | A | * | 12/1937 | Gordon, Jr. | 446/163 |
| 2,460,128 | A | * | 1/1949 | Greenleaf | 43/3 |
| 2,480,390 | A | * | 8/1949 | Thompson | 43/3 |
| 2,628,451 | A | * | 2/1953 | Goldfarb | 446/160 |
| 2,735,219 | A | * | 2/1956 | Gates | 446/163 |
| 2,814,146 | A | * | 11/1957 | Propp | 43/3 |
| 2,931,134 | A | * | 4/1960 | Nevitt | 446/160 |
| 2,984,974 | A | * | 5/1961 | Bell | 43/3 |
| 3,046,697 | A | * | 7/1962 | Pullen | 446/164 |
| 3,074,195 | A | * | 1/1963 | Vanderpool | 43/3 |
| 3,183,663 | A | * | 5/1965 | Sfredda | 446/164 |
| 3,246,419 | A | * | 4/1966 | Pawelka et al. | 446/163 |
| 3,281,984 | A | * | 11/1966 | Wechsler | 446/163 |
| 3,307,290 | A | * | 3/1967 | Pedersen | 446/164 |
| 3,689,927 | A | * | 9/1972 | Boston et al. | 43/3 |

(Continued)

OTHER PUBLICATIONS

Mack's Prairie Wings, BlackRiver Mallard Swimmer Decoy, [retrieved on May 22, 2006], 3 pages. Retrieved from the Internet:<URL: http://www.mackspw.com/item.asp?im=BLR30+HEN&d=BlackRiver_Mallard_Swimmer_Decoy>.*

(Continued)

*Primary Examiner* — Darren W Ark

(57) ABSTRACT

A movable waterfowl decoy includes: (a) a decoy body portion including a buoyant decoy body and a head portion attached to an upper front portion of the decoy body, the buoyant decoy body including at least one body compartment, the body compartment including at least one closeable compartment opening; (b) a power source housed in the at least one body compartment; (c) a spray propulsion system that is substantially housed within the at least one body compartment; (d) a keel attached to a lower surface of the buoyant decoy body; and (e) a remote control system, a remote receiver of which is within the at least one body compartment; wherein the decoy body portion emits an above-water spray of water from a body of water in a generally rearward direction when the waterfowl decoy is in use, which propels the decoy body portion in the body of water. Alternatively, the power source is outside and remote from the decoy body portion, and connected to the spray propulsion system, with a power cable connecting the decoy body portion to the remote power source.

18 Claims, 10 Drawing Sheets

U.S. PATENT DOCUMENTS

| | | | | |
|---|---|---|---|---|
| 4,182,066 A * | 1/1980 | Harmon | | 43/26.1 |
| 4,349,985 A * | 9/1982 | Kodaka | | 446/163 |
| 4,375,337 A * | 3/1983 | Yerger | | 43/3 |
| 4,540,376 A * | 9/1985 | Turbowitz et al. | | 446/164 |
| 4,599,819 A * | 7/1986 | Voges et al. | | 43/3 |
| 4,612,722 A * | 9/1986 | Ferrell | | 43/3 |
| 4,846,751 A * | 7/1989 | Kosoris | | 446/160 |
| 4,984,313 A * | 1/1991 | Hara | | 4/541.4 |
| 5,201,884 A * | 4/1993 | Nicholas | | 43/26.1 |
| 5,377,439 A * | 1/1995 | Roos et al. | | 43/3 |
| 5,566,491 A * | 10/1996 | Phillips | | 43/3 |
| 5,775,022 A * | 7/1998 | Sumrall et al. | | 43/3 |
| 5,809,683 A * | 9/1998 | Solomon | | 43/3 |
| 5,930,936 A * | 8/1999 | Parr et al. | | 43/3 |
| 6,088,944 A * | 7/2000 | Jones | | 43/3 |
| 6,092,323 A * | 7/2000 | McBride et al. | | 43/3 |
| 6,170,188 B1 * | 1/2001 | Mathews | | 43/3 |
| 6,321,480 B1 * | 11/2001 | Solomon | | 43/3 |
| 6,408,559 B2 * | 6/2002 | Mathews | | 43/3 |
| 6,412,209 B1 * | 7/2002 | Kapraly et al. | | 43/3 |
| 6,463,690 B1 * | 10/2002 | Wood et al. | | 43/3 |
| 6,508,028 B1 * | 1/2003 | Crowe | | 43/3 |
| 6,520,105 B2 * | 2/2003 | Koda et al. | | 43/26.1 |
| 6,553,709 B1 * | 4/2003 | Owen | | 43/3 |
| 6,601,333 B2 * | 8/2003 | Cicoff et al. | | 43/3 |
| 6,643,971 B2 * | 11/2003 | Daniels | | 43/3 |
| 6,715,228 B1 * | 4/2004 | Price | | 43/3 |
| 6,729,931 B2 * | 5/2004 | Lee | | 446/163 |
| 6,782,653 B1 * | 8/2004 | Thomas | | 43/3 |
| 6,845,586 B1 * | 1/2005 | Brock, IV | | 43/3 |
| 6,857,216 B1 * | 2/2005 | Merin | | 43/3 |
| 7,043,865 B1 * | 5/2006 | Crowe | | 43/3 |
| 7,472,508 B2 * | 1/2009 | Myers, IV | | 43/3 |
| 7,788,838 B2 * | 9/2010 | Anthony | | 43/3 |
| 2002/0020101 A1 * | 2/2002 | Murray et al. | | 43/3 |
| 2004/0010957 A1 * | 1/2004 | Corbiere, Jr. | | 43/3 |
| 2004/0025770 A1 * | 2/2004 | Saunoris et al. | | 43/3 |
| 2005/0091904 A1 * | 5/2005 | Sullivan | | 43/3 |
| 2006/0016115 A1 * | 1/2006 | Ware et al. | | 43/3 |
| 2006/0207158 A1 * | 9/2006 | Brewer | | 43/3 |
| 2008/0028664 A1 * | 2/2008 | Anthony | | 43/3 |
| 2009/0151217 A1 * | 6/2009 | Gregory | | 43/3 |

OTHER PUBLICATIONS

Mack's Prarie Wings, Turbojet Swimming Mallard Duck Decoy, [retrieved on May 22, 2006], 3 pages. Retrieved from the Internet:<URL: http://www.mackspw.com/item.asp?im=TUB100+MD&d=Turbojet_Swimming_Mallard_Duck_Decoy>.*

Mack's Prairie Wings, [retrieved on Jun. 24, 2008], 47 pages. Retrieved from the Internet:<URL: http://wwwmackspw.com/>.*

Mack's Prairie Wings, BlakcRiver Mallard Thrasher Decoy, [retrieved on Jul. 14, 2008], 1 page. Retrieved from the Internet:<URL: http://www.mackspw.com/Item--i--BLR40S>.*

* cited by examiner

SWIMMING WATERFOWL DECOY WITH SPRAY

CROSS REFERENCE TO RELATED DOCUMENTS

This is a divisional of U.S. patent application Ser. No. 11/647,643, which was filed in the US Patent & Trademark Office on Dec. 29, 2006 now U.S. Pat. No. 7,472,508, as amended. This invention was described in Disclosure Document Number 599487, which was received by the US Patent & Trademark Office on Apr. 25, 2006.

BACKGROUND OF THE INVENTION

1. Technical Field

The present invention relates to a self-propelled waterfowl decoy with an above-water spray that simulates splashing and swimming movements of wild waterfowl on the surface of a body of water.

2. Background Information

The duck hunter is above all a naturalist. Most duck and Canadian geese hunters are rapt observers of avian behavior, especially during early morning hours spent peering out from a duck blind. Though many currently available waterfowl decoys attract wild fowl to a degree, they fall far short of imitating nature.

Some older mechanized duck decoys attempt to simulate the swimming actions of live ducks by moving straight ahead in the water. Such a decoy soon arrives on the opposite bank of the body of water, necessitating "rescue" by the hunter. The hunter must decide whether to contaminate the otherwise peaceful scene by walking up to the bank, turning the decoy back towards the open water, and leaving the bank, whereupon the duck decoy soon arrives at the opposite bank, and so forth.

Though it can also move straight ahead on the water's surface, the waterfowl decoy of the present invention simulates the more random swimming movements of live waterfowl by generating a water spray from the waterfowl decoy and by moving forward randomly to one side or the other, as well as straight ahead. The present decoy attempts to replicate the tendency of live waterfowl to splash and generate movement in the water in addition to a generally forward "swimming" movement. The above-water spray of the present decoy shoots water droplets in the air. The water droplets reflect sunlight in interesting patterns. By more closely imitating nature, the waterfowl decoy of the present invention attracts greater numbers of wild waterfowl to the area in which it is in use.

BRIEF SUMMARY OF THE INVENTION

The present invention is a floating waterfowl decoy with a spray propulsion system that simulates the splashing and swimming movements of live fowl. The waterfowl decoy of the present invention comprises:

(a) a decoy body portion comprising a buoyant decoy body and a head portion attached to an upper front portion of the decoy body, the buoyant decoy body comprising at least one body compartment, the body compartment comprising at least one closeable compartment opening;

(b) a power source housed in the at least one body compartment;

(c) a spray propulsion system that is substantially housed within the at least one body compartment;

(d) a keel attached to a lower surface of the buoyant decoy body; and (e) a remote control system, a remote receiver of which is within the at least one body compartment;

wherein the decoy body portion emits an above-water spray of water from a body of water in a generally rearward direction when the waterfowl decoy is in use, which propels the decoy body portion in the body of water. Alternatively, the power source is outside and remote from the decoy body portion, and connected to the spray propulsion system, with a power cable connecting the decoy body portion to the remote power source.

The self-propelled waterfowl decoy with an above-water spray of the present invention sports important features that attract wild waterfowl, including: 1) Interesting "swimming" movements in the water; 2) Water disturbance by the waterfowl decoy; 3) Reflection of sunlight from the water disturbance.

BRIEF DESCRIPTION OF THE SEVERAL VIEWS OF THE DRAWINGS

A more complete understanding of the invention and its advantages will be apparent from the following detailed description taken in conjunction with the accompanying drawings, wherein examples of the invention are shown, and wherein.

DETAILED DESCRIPTION OF THE INVENTION

Figure 1:
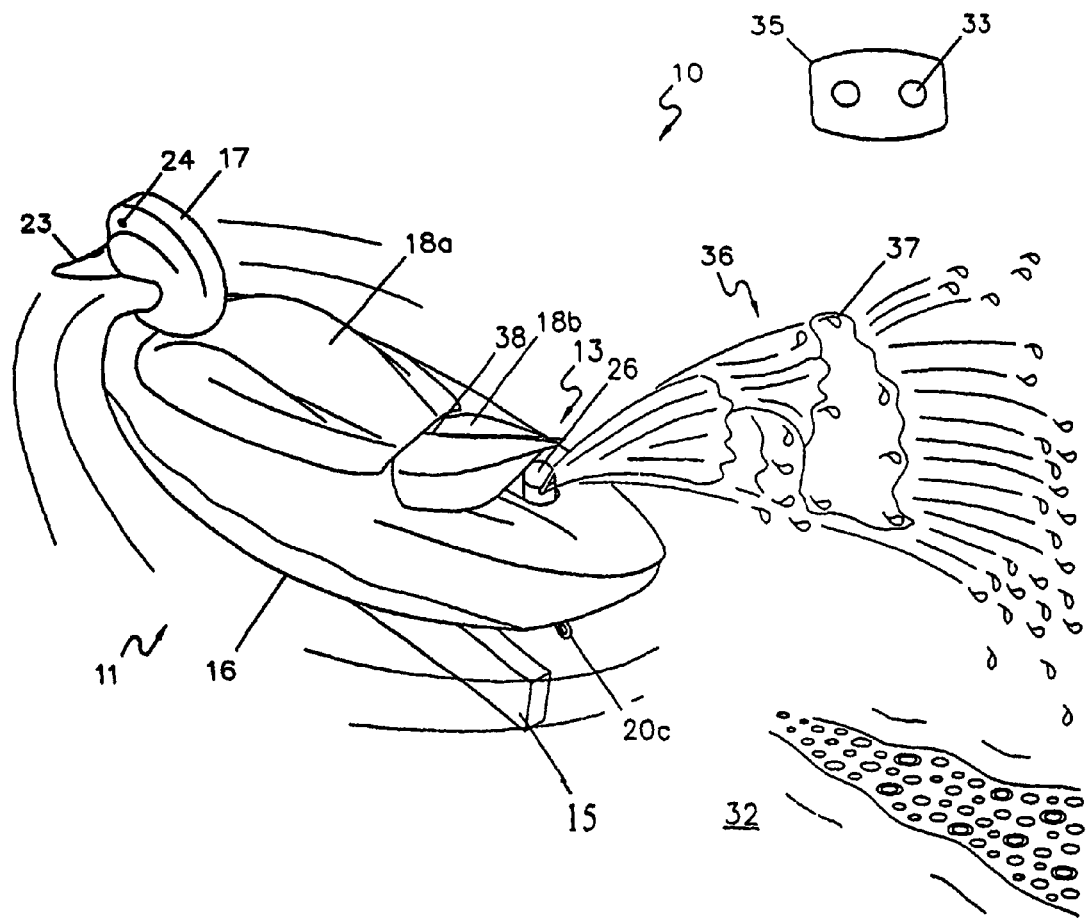
FIG. 1 is a perspective view of a waterfowl decoy according to the present invention.

In the following description, like reference characters designate like or corresponding parts throughout the several views. Also, in the following description, it is to be understood that such terms as "front," "back," "within," and the like are words of convenience and are not to be construed as limiting terms. Referring in more detail to the drawings, the invention will now be described.

Turning first to FIG. 1, a swimming, splashing waterfowl decoy generally referred to herein as 10 comprises several basic components, or systems, including: a decoy body portion 11 with a buoyant body 16 having at least one body compartment 21; 2) a battery 12 or other power source within or outside the decoy body 16; 3) a spray propulsion system 13 by which the waterfowl decoy 10 generates a water spray 36 and moves through the body of water 32 in which it has been placed; and 4) a keel 15 attached to a lower surface of the buoyant body 16. Lastly, the waterfowl decoy 10 includes: 5) either a remote control system 14 for controlling the propulsion system 13, or a power cord 40 leading from a remote battery 12 and controls separate from the decoy body portion (e.g., on the shore or in a boat) to the waterfowl decoy 10 in the water. The spray propulsion system 13 comprises a small electrical pump 25 and a spray nozzle 26. The spray propulsion system 13 generates an above-water spray 36 using water from the body of water 32 on which the waterfowl decoy 10 rests.

FIGS. 1-6 herein show the remote controlled waterfowl decoy 10, and FIGS. 7-12 illustrate a second waterfowl decoy 10 with a power cable 40. In the remote controlled waterfowl decoy 10, the battery 12 or other power source is within the body compartment 21. In the power cable decoy, the battery 12 or other power source is outside and remote from the decoy body portion 11, usually on the shore (or in a nearby boat) where the hunter is.

By "swimming" is meant that the waterfowl decoy 10 is moved along the water's surface by the spray propulsion system 13, which simulates a live waterfowl swimming on a body of water. The rearward water spray 36 generated by the spray propulsion system 13 moves the waterfowl decoy 10 in a generally forward, meandering "swimming" motion and creates splashing, which attracts wild waterfowl. Wild waterfowl are also believed to be attracted by the reflectivity of sunlight off the spray water droplets.

Figure 2:
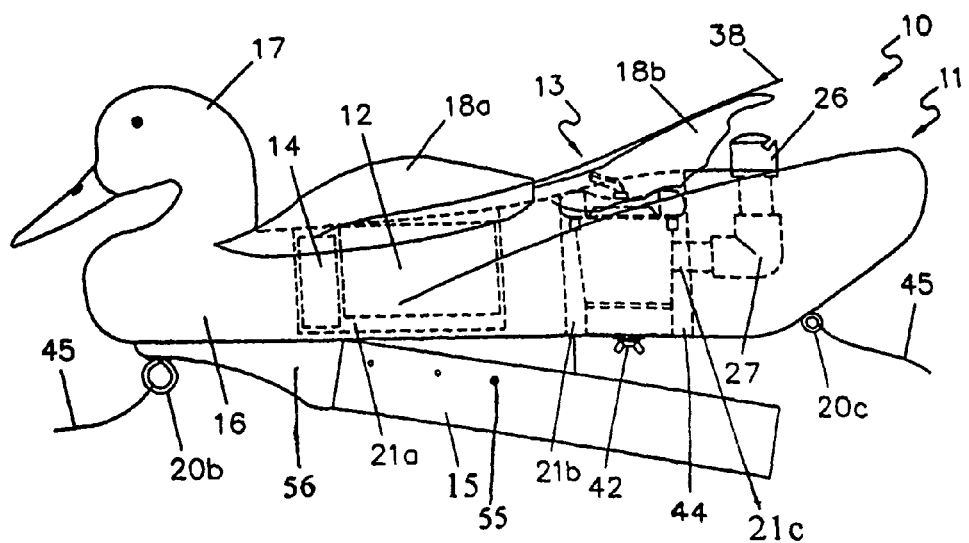
FIG. 2 is a side elevational view of the waterfowl decoy according to FIG. 1.
Figure 3:
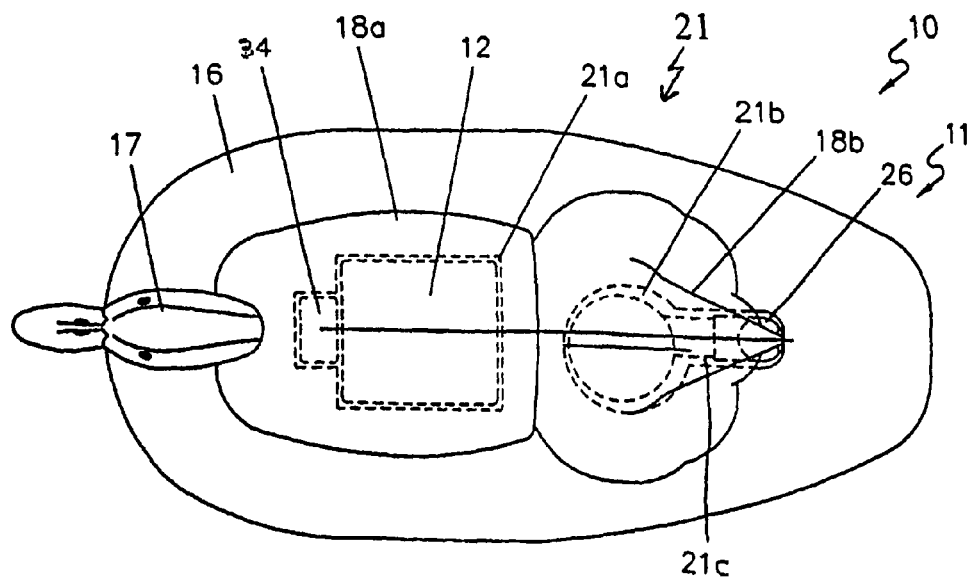
FIG. 3 is a top plan view of the waterfowl decoy according to FIG. 2.

The decoy body portion 11 includes: 1) the buoyant body 16; 2) a head portion 17, which is attached to an upper front part of the decoy body 16; 3) at least one movable back flap 18; 4) at least one body compartment 21 in a central part of the decoy body 16; and 5) at least one swivel 20. The body compartment 21 includes a closeable compartment opening 22, preferably at the top of the body compartment 21. The compartment closure may be the back flap 18, or the compartment closure 39 may be separate from the back flap 18. As seen in FIG. 2, the remote controlled waterfowl decoy 10 includes a first, forward body compartment 21a, which holds the remote receiver box 34 and the battery 12, and a second, aft body compartment 21b, which supports the spray propulsion system 13. The substantially solid decoy body 16 is made of a buoyant material, such as styrofoam or cork, so that it floats on the body of water.

In the first, remote controlled waterfowl decoy 10 shown in FIGS. 1-6, a remote control 35 of the remote control system 14 is in the possession of the nearby hunter. When the waterfowl decoy 10 is in use, the hunter is normally some distance away but still within view of the decoy body portion 11 in the water. The remote control 35 includes on/off levers or buttons 33 for turning the remote control system 14 on and off. The hunter can create random swimming and splashing patterns by turning the system on, which moves the decoy forward, and turning the system off, permitting the decoy to bob in the water. This on/off pattern can then be repeated, which generates interesting decoy movement patterns.

Figure 8:
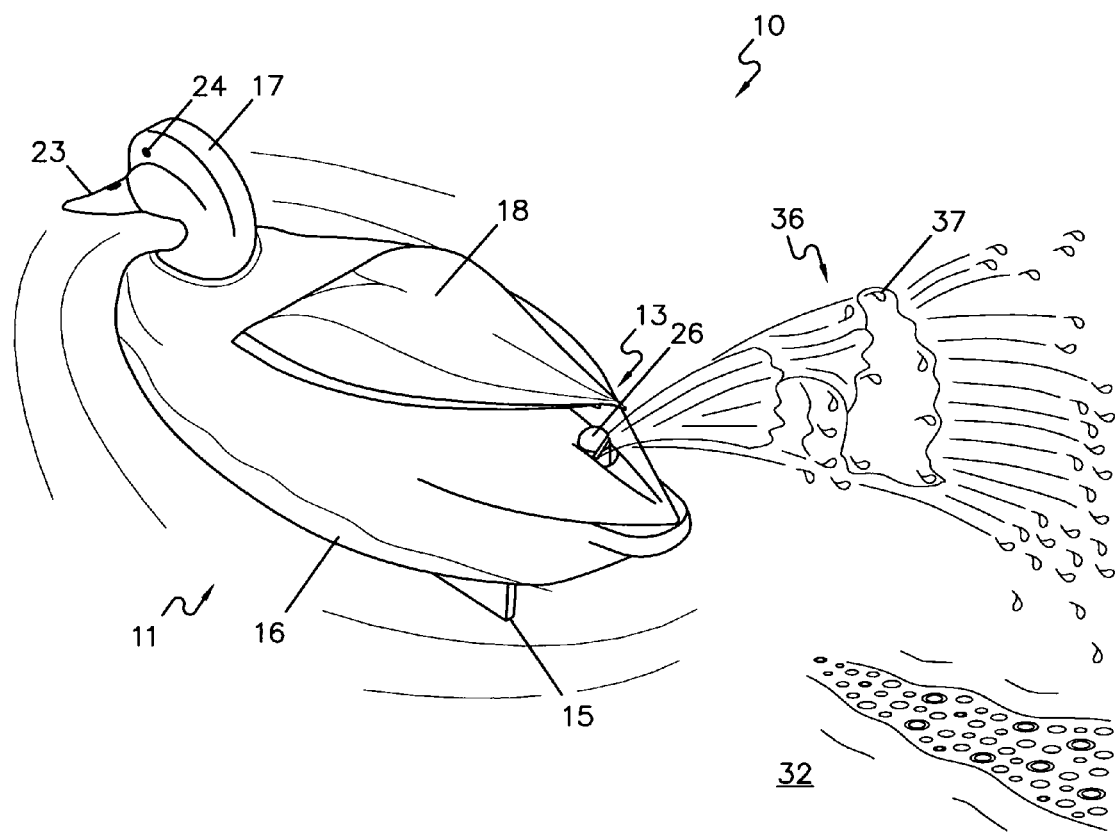
FIG. 8 is a perspective view of a waterfowl decoy according to the present invention.
Figure 9:
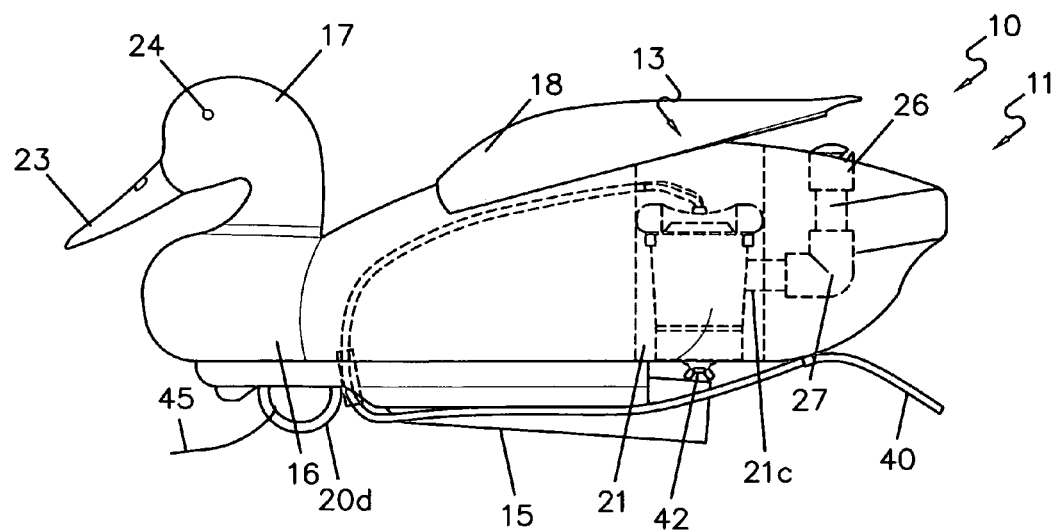
FIG. 9 is a side elevational view of the waterfowl decoy according to FIG. 8.
Figure 10:
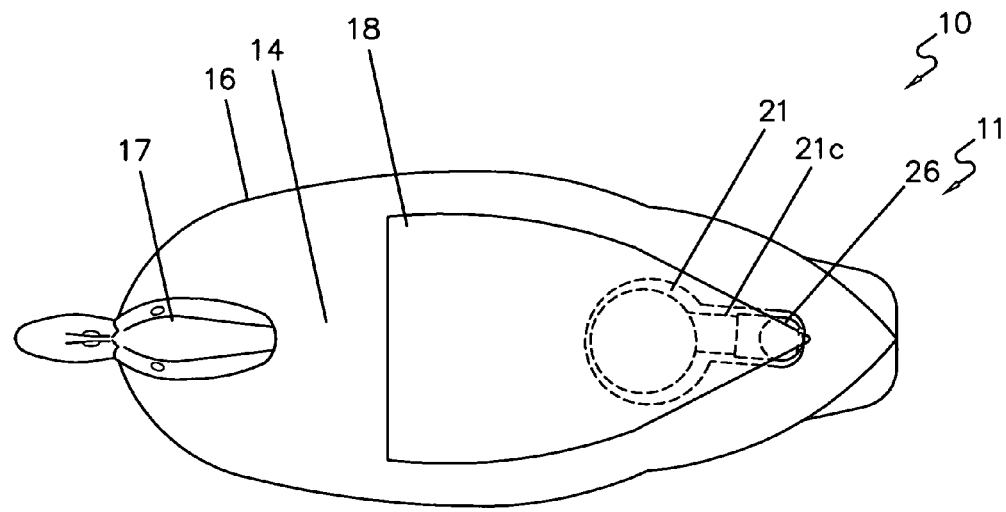
FIG. 10 is a top plan view of the waterfowl decoy according to FIG. 9.
Figure 11:
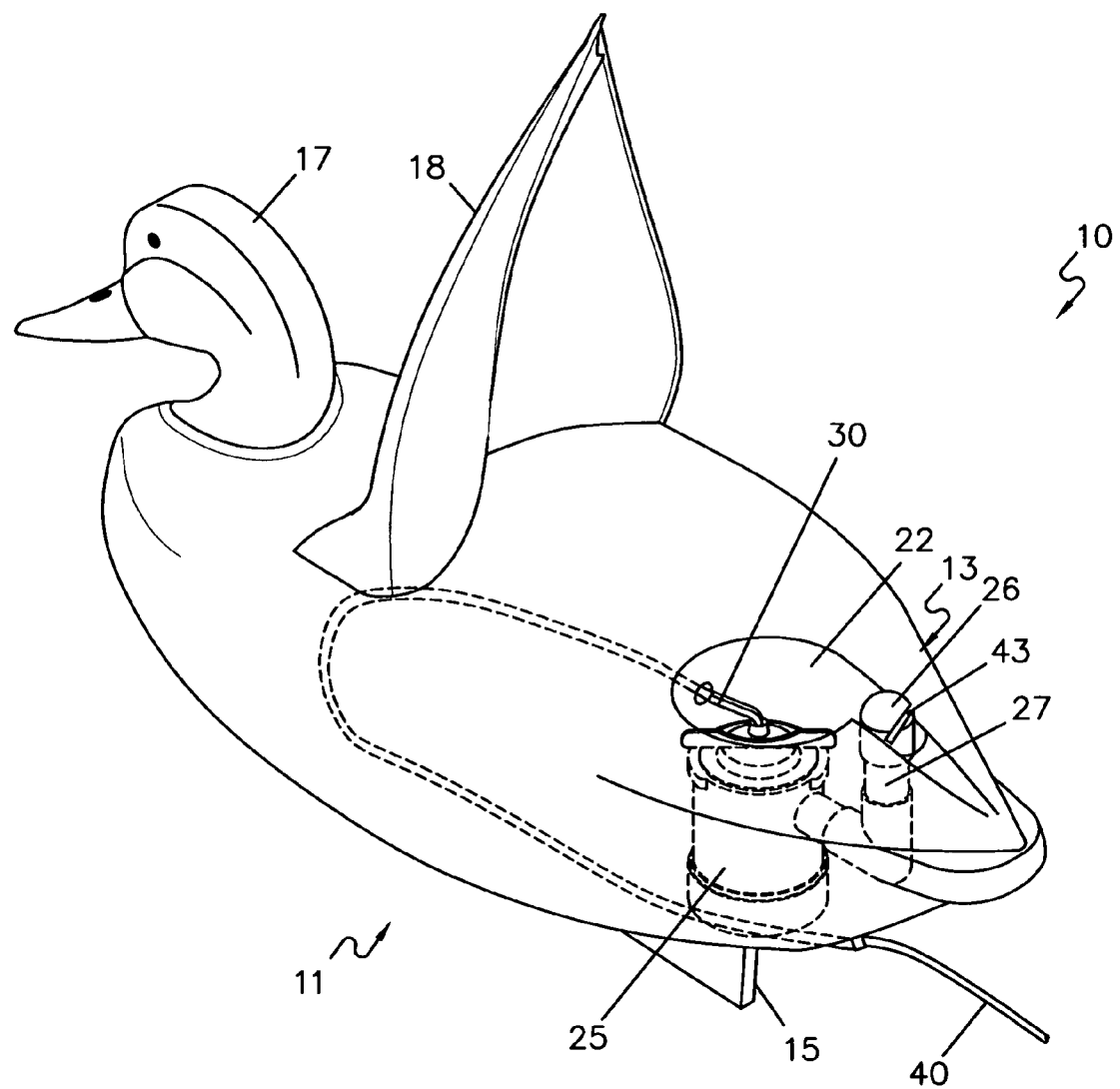
FIG. 11 is a perspective view of a waterfowl decoy according to the present invention, shown with back flap up.

The back flaps 18 of both the remote control and power cable decoys 10 are movable between a closed position over the compartment opening 22 (as seen in FIG. 9), and an open position apart from the compartment opening 22 (see FIG. 11). The flexible back flap 18 provides easy access to internal components in the compartment 21 below the back flap. The back flaps 18 also prevent rain and water from entering the battery 12 and the compartments 21. The remote control waterfowl decoy 10 has two back flaps 18, as seen in FIG. 1, and the power cable decoy has one back flap 18 (see FIG. 8).

Figure 4:
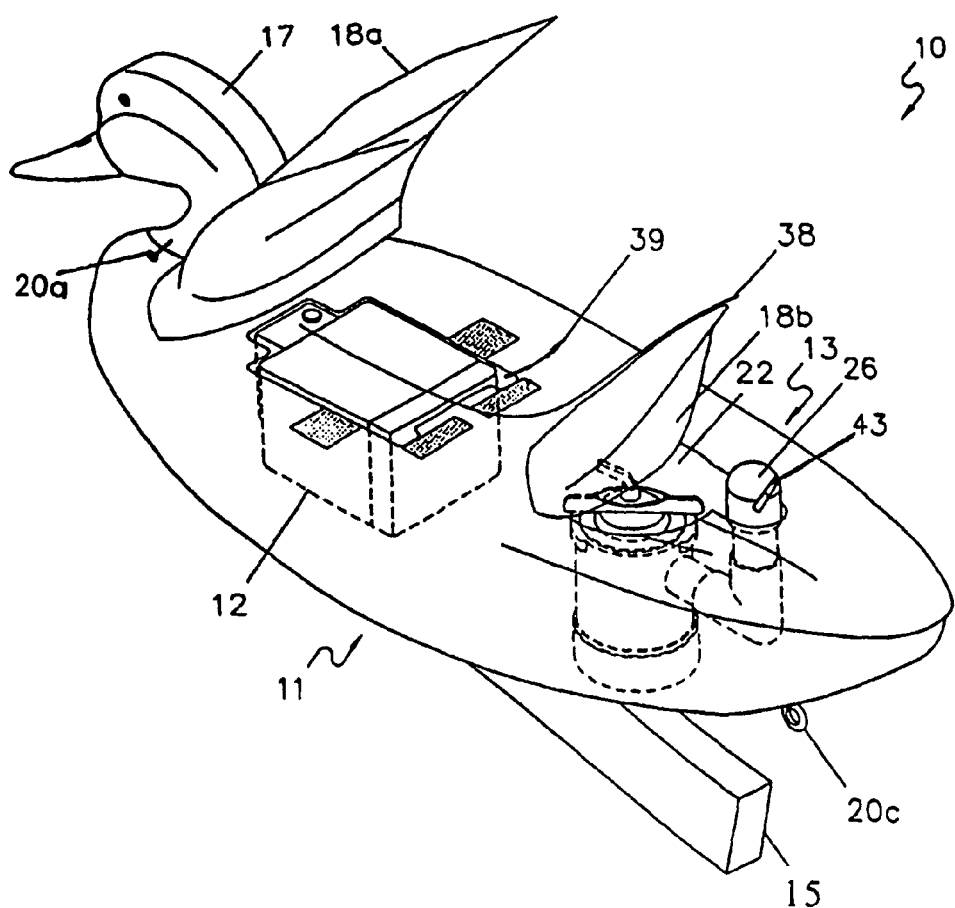
FIG. 4 is a perspective view of a waterfowl decoy according to the present invention, shown with back flaps up.

As seen in FIGS. 1-4, the second, aft back flap 18b is at the rear of the waterfowl decoy 10 on its back, and the first, forward back flap 18a is in front of the second back flap 18b on the decoy's back behind its head portion 17. Each back flap 18 is attached at its front end to the upper surface of the decoy body 16. The back flaps 18 are made of a flexible, water-resistant material, such as rubber. The back flaps 18 are preferably concave and made of a flexible yet rigid enough material to be lifted up and bent back by the hunter into the open position for access to the compartments 21. The concave shape is advantageous in that it permits the back flaps 18 to remain in the open position until they are released by hand to the closed, steady state position over the compartment opening 22. Also, the hump formed by the top of the concave shape of the forward back flap 18a resembles the humped back of a live duck or other waterfowl. The concavity also extends the two opposite sides of the back flaps 18 over the corresponding opposite sides of the compartment opening 22, which helps deter water from entering the compartments. As seen in FIG. 4, the first back flap 18a is preferably substantially wider and longer than the second back flap 18b, which is pointed at its rear, to more closely resemble the back feathers of a waterfowl. Even in the closed position as shown in FIG. 2, the pointed rear tip of the second back flap 18b extends up over but does not contact the spray nozzle 26. This position permits it to conceal but not interfere with spray from the nozzle 26.

Figure 7:
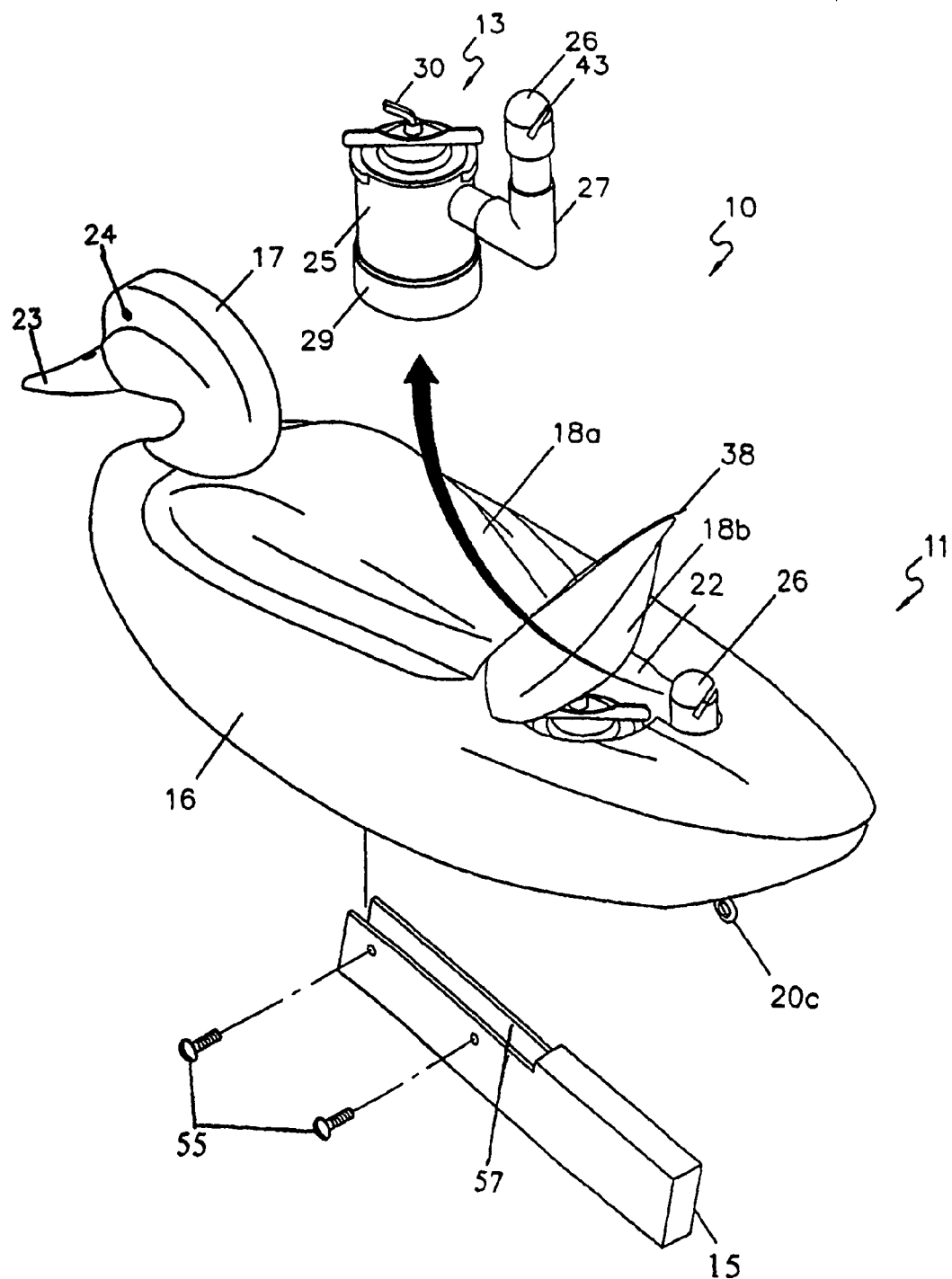
FIG. 7 is an exploded view of a second waterfowl decoy according to the present invention.

As seen in FIG. 4, a first swivel 20a preferably connects the decoy head portion 17 to the buoyant body 16, so that the decoy head portion is swivelable. Arbitrary movement of the decoy 10 as it swims along, perhaps bumping into debris or rocks, or being rocked by ripples in the body of water, will on occasion rock the separate decoy head portion 17, causing it to swivel on the first swivel 20a. This simulates movement of the head of a live fowl and therefore adds to the attractiveness of the waterfowl decoy 10. Alternatively, a metal bolt may be used to attach the decoy head portion 17 to the body 6, in which case the head portion 17 is stationary. As seen in FIGS. 1 and 7, the decoy head portion 17 includes the head and neck area, a beak 23, and eye markings 24 on opposite sides of the head. The head portion 17, decoy body 16, and back flaps 18 are preferably colored and shaped to imitate the species specific markings of a particular waterfowl species, as desired.

Figure 13:
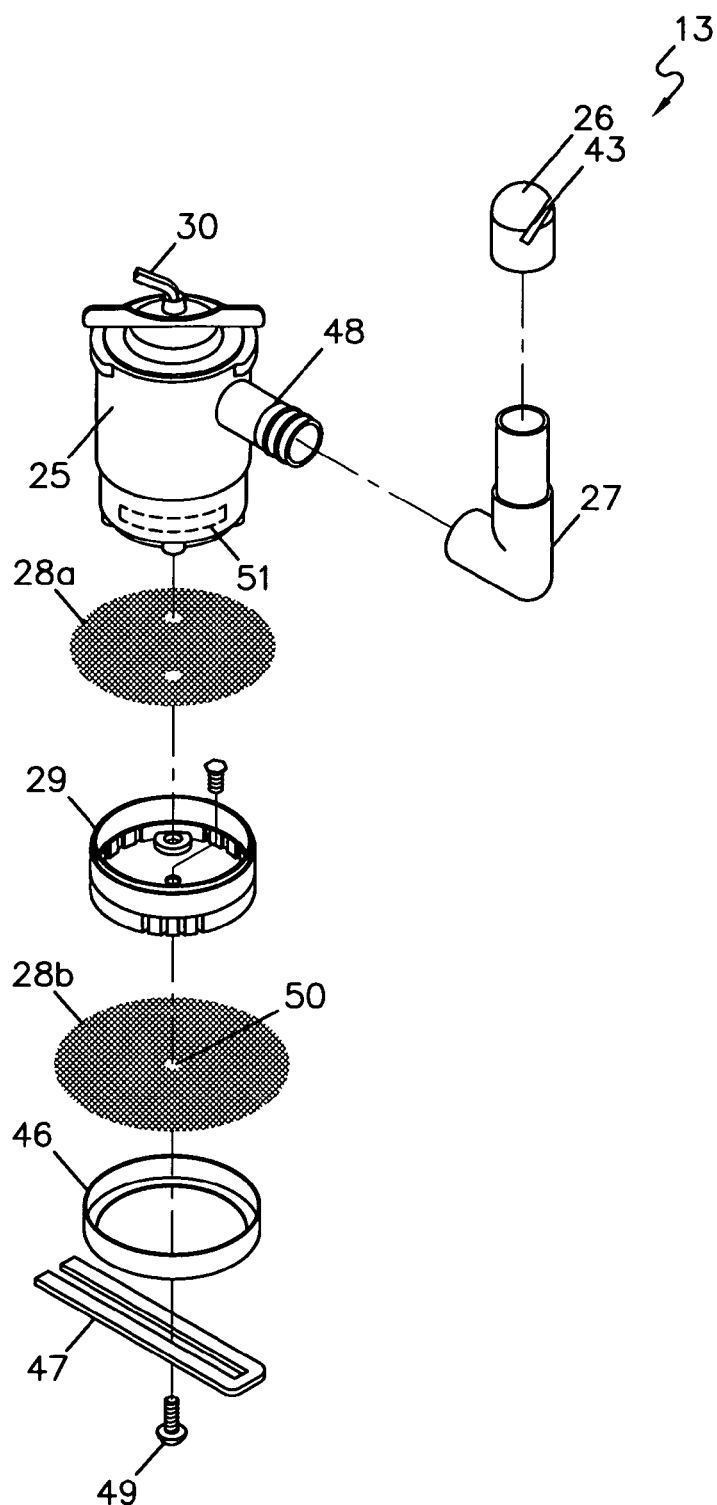
FIG. 13 is an exploded view of a spray propulsion system of a waterfowl decoy according to the present invention.

As shown in FIGS. 2, 7, and 13, the spray propulsion system 13 includes: a small water pump 25 and a spray nozzle 26 in the decoy 10. The spray nozzle 26 is at the rear of the decoy's back, as seen in the figures. An electrical wire 30 connects the pump 25 to the battery 12 in either the forward compartment (first, remote controlled decoy) or through the power cable to the remote battery (second, power cable decoy).

The aft compartment 21b is preferably generally cone-shaped in order to support the generally cylindrical or cone-shaped pump 25 without the pump slipping down and out of the decoy body 16 through a hole 44 in the bottom of the body compartment 21b. The decoy body 16 is made of a water-resistant, buoyant material, such as styrofoam or cork, so that it floats in the water regardless of the bottom compartment hole 44. The aft compartment 21b is shaped so that it closely accommodates the pump 25.

Figures 5, 6:
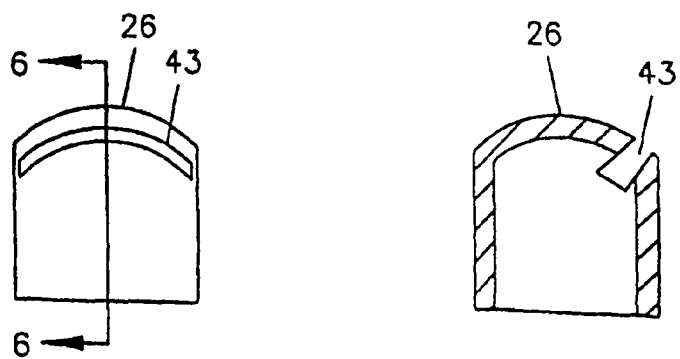
FIG. 5 is a side elevational view of a nozzle of the waterfowl decoy according to FIG. 4.
FIG. 6 is a cross-sectional view of the nozzle of the waterfowl decoy according to FIG. 6, taken along line 6-6.
Figure 4B:
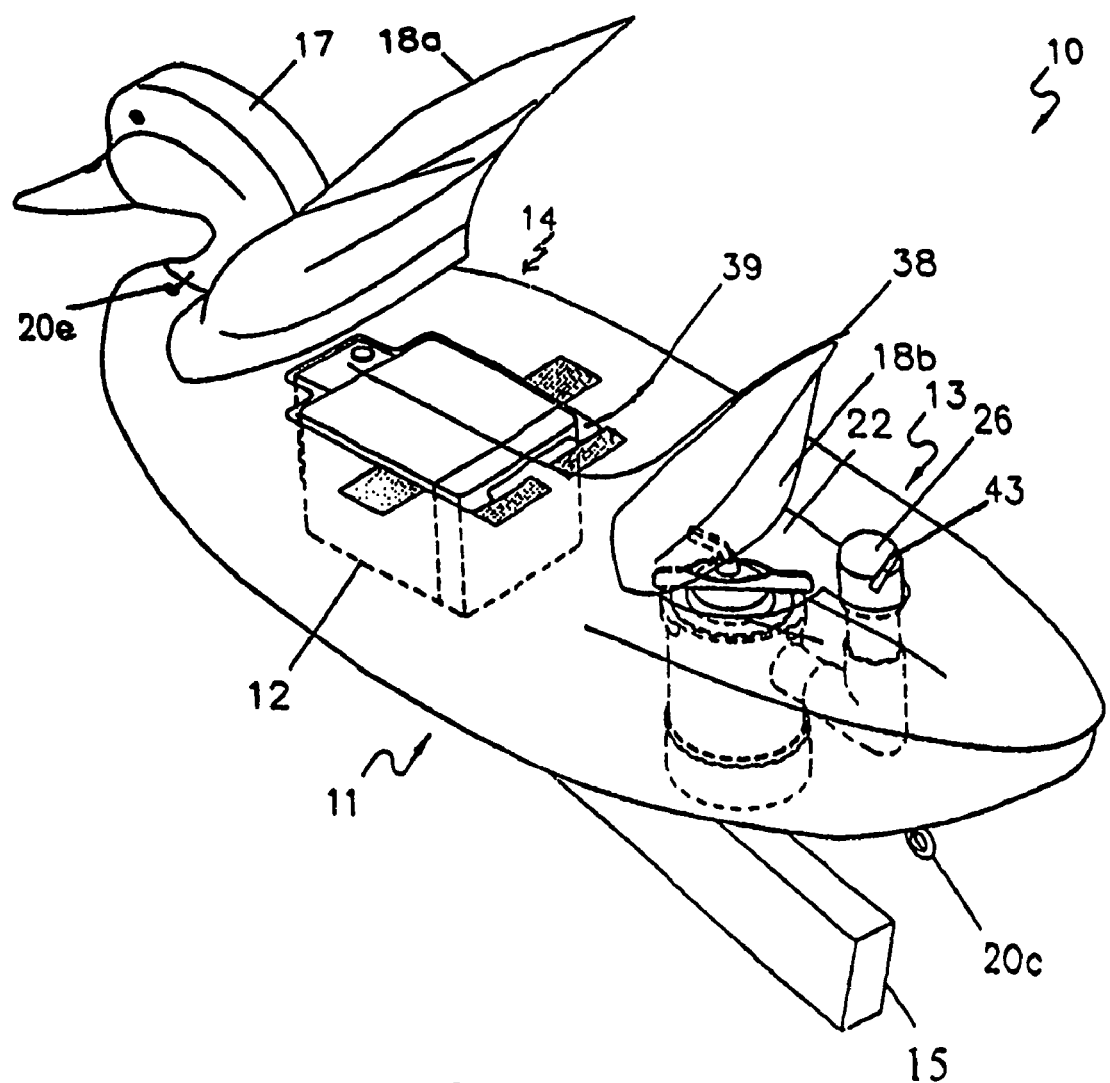

As seen in FIG. 13, an L-shaped nozzle arm 27 extends from an outlet 48 on an upper portion of the pump 25. As shown in FIG. 2, the aft compartment 21b includes a shallower, aft arm supporting portion 21c for supporting the nozzle arm 27. The spray nozzle 26 fits closely over the top of the nozzle arm 27 (see FIG. 13). The nozzle 26 and nozzle arm 27 are made of a durable, water-resistant material, such as polyvinyl chloride (PVC). The pump 25 is preferably a 12 volt electric pump. The spray nozzle 26 includes an arched spray slot 43 on the side of the nozzle facing the rear of the decoy, as illustrated in FIGS. 4-6. The spray nozzle 26 is positioned at the top back of the decoy 10 pointing rearward. The spray nozzle slot 43 is large enough so that it is unlikely to be clogged by debris from the pond or other body of water.

Continuing with FIG. 13, the pump 25 in each decoy variation supports at least one filter 28, and preferably two horizontally oriented filters, at the base of the pump 25 for filtering the incoming water from the body of water. The filters 28 are important because they prevent the pump 25 from being fouled by algae and other detritus commonly found in a pond, lake, or other body of water where live waterfowl can be found. The first, uppermost filter 28a is held in place by a coupling 29 that fits over the base of the filter. The pump coupling 29, which can be screwed onto the base of the pump 25 (also see FIG. 12), is preferably removable so that the filter 28 can be cleaned or replaced as needed. The second, lower filter 28b, which is preferably the same size and material as the first, filter 28a, fits into a base of the filter coupling 29. It is held in place by a generally ring-shaped collar 46. The filters 28 are preferably circular-shaped and made of a water-resistant nylon mesh netting. The dual filter system does not allow particulate matter in the water to enter the pump 25. The filter 28b and pump coupling 29 include centrally located holes 50 through which a shaft of a screw 49 passes. The screw 49 holds the pump filters 28 in place. As seen in FIG. 2, a wing nut 42 may be used instead of the screw 49. A stabilizer fork 47 is preferably placed between the head of the screw 49 and the pump collar 46 to further stabilize the second, outer filter 28b. The pump collar 46, stabilizer fork 47, and screw 49 are also preferably removable so that one or both filters 28 can be rinsed off or removed and cleaned or replaced as needed.

When the waterfowl decoy 10 (either of the two variations) is in use, water from the body of water 32 in which the decoy is floating is taken in through the bottom compartment hole 44 by action of the pump 25. The water is sucked through the pump 25, which includes an intake impeller 51 positioned in the decoy 10 so that it is below the waterline. When the pump 25 is on, the generally horizontal intake impeller 51 in the pump is rotating. The water is pumped out through the nozzle arm 27 and sprayed out through the spray nozzle 26. The spray nozzle slot 43 is arched and sized so that the water spray 36 is made of large size droplets 37. The spray 36, which is lofty and sparkles in the sunlight, splashes on the back of the waterfowl decoy 10 and on the surrounding water. The large size droplets 37 make noise when they land on the water and on the back of the decoy body. The spray 36 from the decoy 10 simulates the spray of water that a busy live duck or other waterfowl might kick up on the water's surface. The force of the spray 36 from the rear of the decoy drives the decoy 10 in a generally forward direction. The waterfowl decoy 10 is thereby propelled in a generally forward, left, or right direction.

Importantly, the spray nozzle slot 43 is formed and directed so that the stream of liquid exiting the spray nozzle 26 is sprayed in an upward, rearward direction (in both variations; see FIGS. 1 and 8). This directs the waterfowl decoy 10 in a generally forward direction, and creates a curtain of water that can be seen by airborne waterfowl. Airborne wild waterfowl are attracted to the water spray from, and movement of, the waterfowl decoy 10. In particular, the spray 36 of water from the decoy spray nozzle 26 has been found to attract flying ducks from great distances. A flock of real ducks in the water will create ripples and small sprays of water here and there, even on a morning when the water is quite still. The water surrounding the live ducks sparkles from sunlight striking the ripples. The waterfowl decoy 10, which can be placed in a group of standard, hollow body duck decoys, creates a similar impression. The water spray 36 is emitted from the waterfowl decoy 10 above the waterline of the body of water on which the decoy is floating. The spray nozzle 26 is preferably oriented so that the spray 36 from the arched nozzle slot 43 is directed at an angle of between about 40 and about 50 degrees relative to the generally horizontal level of the water surface beneath the waterfowl decoy 10 when the decoy is in use. If the spray instead rose straight up from the decoy body portion, the decoy would likely rock back and forth rather than moving forward.

Preferably, the nozzle 26 is generally cylindrical and between about 0.8 and about 1.2 inch in diameter, and the nozzle slot length is about equal to the diameter of the nozzle. Most preferably, the nozzle is about one inch in diameter, and the arched nozzle slot 43 is about 0.8 inch in length and about 0.2 inch wide, with a relatively even width along the length of the slot, for a directed spray.

The waterfowl decoy 10 is quiet. The sound of the pump 25 in the decoy 10 is not loud enough to scare away live waterfowl attracted to it. Preferably, the only moving part when the waterfowl decoy 10 is in use is the quiet intake impeller 51 on the water pump. If necessary, a new motor can easily be inserted in the generally cylindrical, slightly conical pump 25. The only moving part (the impeller) is below water level, so it will not freeze up during extreme weather conditions.

The battery 12 and its wiring can easily be removed from the decoy body compartment 21, if desired. Recharging can be conducted with the battery 12 still in the waterfowl decoy 10. Alternatively, the battery 12 can be removed from the decoy body portion 11 for charging, if desired. A second battery can easily be utilized if it is needed for more running time on extended outings.

As seen in the waterfowl decoy 10 of FIGS. 1-6, the remote control system 14 includes: 1) a remote receiver box 34 within the body compartment 21, as seen in FIGS. 1 and 2; 2) an antenna 38; and 3) a remote control transmitter 35 with an off/on receiver and toggle switches 33 (see FIG. 1). When the "on" button or toggle switch 33 on the remote control 35 is moved, the remote receiver 34 receives the signal via the antenna 38 and the relay cuts on. Electricity from the battery 12 flows to the pump 25. Water taken in through the pump 25 is sprayed out through the spray nozzle 26. Both the battery 12 and the remote receiver 34 are removable from the decoy body portion 11, in case the user chooses to operate the decoy with an external battery. The battery 12 and remote receiver 34 may be left in the decoy 10 during storage, if desired.

The remote control system 13 includes the antenna 38, which extends out along the decoy's back from the remote receiver box 34. The antenna 38 preferably passes beneath the first, forward back flap 18a. From there, the antenna 38 extends along the top of the second, aft back flap 18b along the midline of the aft back flap and out over the pointed tip of the aft back flap. The antenna 38 extends slightly beyond the tip of the second back flap 18b, as seen in FIG. 4, but does not extend into the spray stream from the nozzle.

In the power cable waterfowl decoy 10 shown in FIGS. 7-12, an external power source in the vicinity of the decoy body portion 11, such as a 12 volt battery 12 in a blind, watercraft, or the like. Here, the decoy body portion 11 only has one body compartment 21, since no compartment is needed for holding a small battery or a remote receiver. One back flap 18 covers the compartment opening 22. The back flap 18 is preferably concave and flexible, so that it has a realistic hump shape when closed as seen in FIG. 8, and can be lifted into an open position as shown in FIG. 11 for access to the body compartment 21. Once it is bent into the open position, the back flap 18 stays open until it is bent back into the closed position covering the compartment opening 22.

Figure 12:
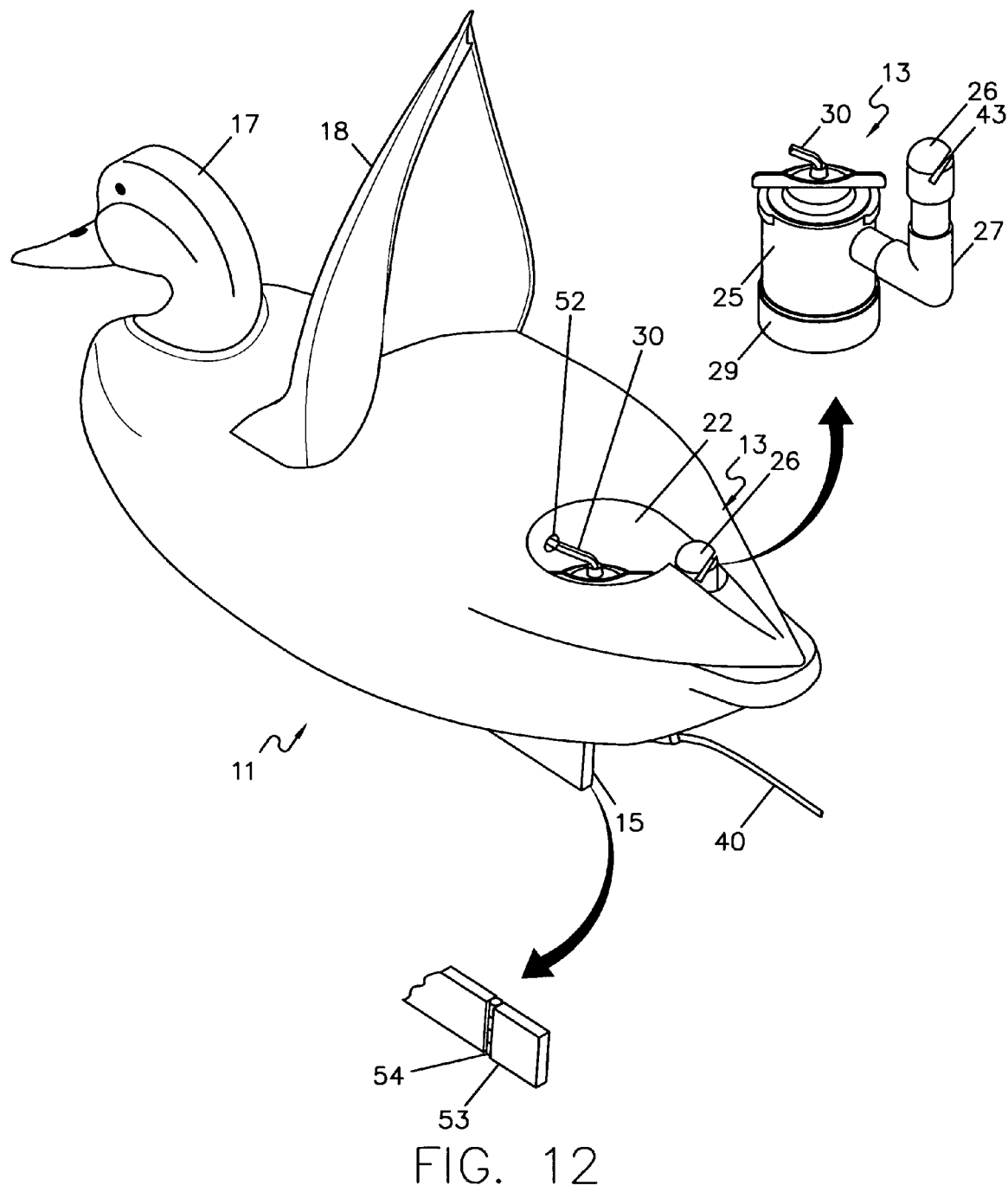
FIG. 12 is a perspective view of a waterfowl decoy according to the present invention, showing a movable keel.

In the waterfowl decoy 10 shown in FIGS. 7-12, the power cable 40 includes an electrical wire 30 extending through a protective, water-resistant, flexible, hollow tubing. The power cable 40 extends between the remote battery 12 and controls (usually positioned on-shore) and the electrical water pump 25 in the decoy body portion 11. The control (which resembles the control 35 with buttons 33 in FIG. 1) includes off/on switches, which are controlled by the user. The user manipulates the off/on switch(es) to cause the water spray 36 to be emitted in short, intermittent bursts. This causes realistic movement of the waterfowl decoy 10 (as described herein). As seen in FIGS. 9 and 12, the power cable 40 extends under the decoy body portion 11 and up through a power cable hole 52 in the decoy body portion 11. The end of the power cable 40 is connected to the top of the pump 25.

As seen in the figures, the waterfowl decoy 10 (both variations) also includes a keel 15 to balance the decoy 10 and direct its movements. It is attached to the bottom of the decoy 10. The generally rectangular keel 15 extends along the longitudinal axis of the decoy 10. The keel 15 helps to keep the decoy body portion 11 aligned.

The keel 15 is preferably an extended, stationary metal keel as seen in FIG. 1. The extended metal keel 15 balances the decoy body portion 11, so that it rides the water like a duck or other live waterfowl. As seen in FIG. 2, the keel 15 preferably extends down into the water at an angle between about 40 and about 50 degrees for increased stability and to leave room for the pump wing nut 42 and the user's fingers. The pump wing nut 42 is accessible to the user, in case he or she wishes to pull the decoy body portion 11 out of the water and clean or change the pump filter(s) 28. As seen in FIGS. 2 and 7, the keel 15 is preferably attached by keel screws 55 or the like to a front keel piece 56, which fits into a keel slot 57 in the front of the keel 15. The front keel piece 56 is attached to the bottom front of the buoyant body 16.

Referring to FIG. 12, the decoy 10 optionally includes a movable keel end portion 53 that is attached by a hinge 54 to the remainder of the keel 15 at the free end of the keel. The hunter has the option of turning the keel end portion 53 to the left or right before putting the decoy body portion 11 in the water if the hunter wants the decoy body portion 11 to gradually turn in a circle or gyre when the pump is on. If it is loose instead, the hinged keel end portion 53 moves arbitrarily as the decoy body portion 11 and the surrounding water move, adding interesting, realistic movements as the decoy "swims". A line (not shown) can optionally be attached to the movable keel end portion 53 for the hunter to manipulate.

Optional secondary components of the waterfowl decoy 10 (either variation) include: 1) one or more additional swivels 20 connected to the decoy body portion 11; and optionally 2) a line 45 attached to the swivel 20. In addition to the first, head swivel 20a, the decoy 10 may include a second swivel 20b or loop attached to a front end of the decoy body portion 11 at the bottom of the decoy body portion (see FIG. 3). One end of a line 45, which may be a string, wire, or cord, is attached to the second swivel 20b for the hunter to pull, if desired. As seen in FIGS. 1, 2, 4, and 7, a third swivel 20c or loop under the back, lower end of the decoy body portion may be attached to a line 45, which may be a string, wire, or cord. The line 45 attached to the third swivel 20c can be used as a jerk string to assist the user/hunter in controlling the swimming direction of the decoy body portion 11. The line 45 may extend to a fourth swivel 20d/loop on the decoy body portion 11 (see FIG. 9). In the power cable decoy 10, the power cable 40/electrical wire 30 extending from the remote battery 12 can be used as a jerk string.

The waterfowl decoy 10 may also include an anchor attached to an opposite end of a line 45. The anchor holds the decoy body portion 11 in a relatively stationary position on the body of water. When the decoy body portion 11 reaches the end of the anchor line, the decoy body portion turns in a circle.

The opposite end of a line attached to a swivel or loop can also be attached to a slave decoy, with a number of slave decoys in line behind the waterfowl decoy 10. Seeing a string of what appear to be ducks swimming on a body of water is attractive to ducks and certain live waterfowl, which tend to swim along behind one another. In this manner, a front one of the waterfowl decoys 10 can pull a number of non-motorized waterfowl decoys behind it. The decoy is powerful enough for a number of slave decoys to be tethered to it. The waterfowl decoy 10 adds realism to an entire decoy spread. The decoy 10 creates ripples throughout the decoy spread. This decoy arrangement provides a life-like appearance to live waterfowl viewing the decoy spread from the air.

The waterfowl decoy 10 does not require assembly or disassembly, and is easy to store and transport. It is only necessary to connect the electrical wires if one is using the external source of power (e.g., on-shore battery 12). The decoy can be used in conjunction with anchors, stakes, slave decoys, etc.

From the foregoing it can be realized that the described device of the present invention may be easily and conveniently utilized as a self-propelled waterfowl decoy for attracting waterfowl game. It is to be understood that any dimensions given herein are illustrative, and are not meant to be limiting.

While preferred embodiments of the invention have been described using specific terms, this description is for illustrative purposes only. It will be apparent to those of ordinary skill in the art that various modifications, substitutions, omissions, and changes may be made without departing from the spirit or scope of the invention, and that such are intended to be within the scope of the present invention as defined by the following claims. It is intended that the doctrine of equivalents be relied upon to determine the fair scope of these claims in connection with any other person's product which fall outside the literal wording of these claims, but which in reality do not materially depart from this invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A swimming, spraying waterfowl decoy, comprising:
    (a) a decoy body portion comprising a buoyant decoy body and a head portion attached to an upper front portion of the decoy body, the buoyant decoy body comprising at least one body compartment, the at least one body compartment comprising at least one closeable compartment opening;
    (b) a power source housed in the at least one body compartment;
    (c) a spray propulsion system comprising a pump that is substantially housed within the at least one body compartment, a nozzle arm extending from the pump, and a spray nozzle at an upper end of the nozzle arm, the spray nozzle being in fluid communication with the pump and the nozzle arm, an upper portion of the spray nozzle being above the top rear surface of the decoy body;

(d) a keel attached to a lower surface of the buoyant decoy body; and (e) at least one back flap connected at one end of the at least one back flap to a top rear surface of the decoy body, the at least one back flap being movable between an open position away from the at least one body compartment, and a closed, steady state position wherein a portion of the at least one back flap rests on the top rear surface of the decoy body and extends over the at least one body compartment; wherein the decoy body portion emits an above-water spray of water from a body of water substantially upward and behind the waterfowl decoy when the waterfowl decoy is in use, which propels the decoy body portion in the body of water.

2. The waterfowl decoy according to claim 1, further comprising f) a remote control system, a remote receiver of which is within the at least one body compartment.

3. The waterfowl decoy according to claim 2, comprising a first, forward one of the at least one body compartments, which holds a remote receiver box and the power source, which is a battery, and a second, aft one of the at least one body compartments, which supports at least a portion of the spray propulsion system.

4. The waterfowl decoy according to claim 3, wherein a compartment closure of the at least one body compartment is the at least one back flap, the at least one back flap being pointed at its rear.

5. The waterfowl decoy according to claim 2, wherein the remote control system further comprises an antenna and a remote control transmitter.

6. The waterfowl decoy according to claim 2, wherein the power source is a battery.

7. The waterfowl decoy according to claim 6, wherein the above-water spray is directed at an angle of between about 40 and about 50 degrees relative to the waterfowl decoy in a generally horizontal position while the pump is on and the waterfowl decoy is in use, the spray nozzle being generally cylindrical in shape and comprising an arch-shaped spray nozzle slot, the spray nozzle slot length being about equal to a diameter of the generally cylindrical spray nozzle.

8. The waterfowl decoy according to claim 6, wherein the pump further comprises an intake impeller, the impeller being below water level and being the only moving component of the waterfowl decoy, the waterfowl decoy being propellerless.

9. The waterfowl decoy according to claim 6, wherein a first one of the at least one body compartments supports the battery, the pump, and at least a portion of the nozzle arm.

10. The waterfowl decoy according to claim 1, wherein the at least one compartment opening is covered by the at least one back flap, the at least one back flap being movable between the closed position over the at least one compartment opening and the open position apart from the at least one compartment opening.

11. The waterfowl decoy according to claim 1, wherein the decoy body portion comprises two of the at least one body compartments in the buoyant decoy body, of which one is a forward body compartment and one is a generally cone-shaped aft body compartment.

12. The waterfowl decoy according to claim 1, further comprising a movable keel end portion attached to the keel by a hinge.

13. The waterfowl decoy according to claim 1, wherein a rear tip of the at least one back flap extends over the spray nozzle of the spray propulsion system without interfering with a spray emitted from the spray nozzle when the at least one back flap is in the closed, steady state position.

14. The waterfowl decoy according to claim 1, wherein the spray nozzle comprises an arch-shaped spray nozzle slot facing a rear of the decoy, the arch-shaped spray nozzle slot bisecting a top surface of the spray nozzle.

15. The waterfowl decoy according to claim 14, wherein the nozzle arm is L-shaped and extends from an outlet on an upper portion of the pump, the entire spray nozzle being generally cylindrical in shape.

16. The waterfowl decoy according to claim 15, wherein the pump fits closely within the at least one body compartment, the decoy body comprising only one of the at least one body compartments, the pump comprising two horizontally oriented, water resistant filters, with a first one of the two horizontally oriented, water resistant filters above a second one of the two horizontally oriented, water resistant filters in the pump.

17. The waterfowl decoy according to claim 1, wherein the decoy body portion comprises one of the at least one body compartments, and one of the at least one back flaps.

18. The waterfowl decoy according to claim 17, further comprising a remote control system, and wherein the power source is a battery, and the body compartment holds a remote receiver of the remote control system, the battery, the pump, and the nozzle arm.

\* \* \* \* \*